UNITED STATES PATENT OFFICE 2,573,080

α-(MONONITRO-MONOCYCLIC-ARYL)-β-HALO-ETHYL LOWER ALKYL ETHERS

Joseph M. Wilkinson and George W. Pedlow, Easton, Pa., and Roger F. Kleinschmidt, Belvidere, N. J., assignors to General Aniline & Film Corporation, New York, N. Y., a corporation of Delaware No Drawing. Application July 11, 1950, Serial No. 173,224

6 Claims. (Cl. 260—611)

This invention relates to α-(mononitro-monocyclicaryl)-β-halo-ethyl lower alkyl ethers.

α-Chloromethyl-4-nitrobenzyl methyl ether is a highly desired product for the preparation of p-nitroacetophenone which is converted to α-bromo-p-nitroacetophenone which is utilized as an intermediate in the synthesis of the antibiotic chloromycetin:

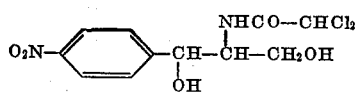

The p-nitroacetophenone prepared by a previous method involved the acylation of the sodium or the magnesium methoxy or ethoxy derivative of diethyl malonate with p-nitro-benzoyl chloride. The resulting dimethyl- or diethyl-acylmalonate was hydrolyzed and decarboxylated in the presence of glacial acetic and sulfuric acids by the usual method for the ketonic cleavage of certain β-keto esters.

p-Nitroacetophenone has also been prepared by the hydration of p-nitrophenyl propiolic acid followed by decarboxylation, condensation of nitrobenzoyl chloride with acetoacetic ester followed by hydrolysis or decarboxylation, by the air oxidation of p-nitroethylbenzene in the presence of ($CrO_3$) at 145° C., by the nitration and subsequent oxidation of methylphenylcarbinol, and by treatment of p-nitroethylbenzene with t-butylnitrite and sodium t-butoxide followed by hydrolysis of the resulting oxime.

All of the foregoing methods are involved, time consuming, and use relatively expensive and sometimes unavailable chemicals. In addition, unsatisfactory conversions are obtained in the synthesis.

It has been observed that a more expeditious route to the p- as well as to the o- and m-nitroacetophenones may be effected by the dehydrohalogenation of α-(mononitro-monocyclicaryl)-β-halo-ethyl lower alkyl ethers followed by hydrolysis.

Accordingly, it is an object of the present invention to provide such ethers.

Other objects and advantages will become apparent from the following description.

The foregoing objects are readily accomplished by reacting a styrene with a halogen and a lower alkyl alcohol. During this initial reaction, a lower alkoxy group and a halogen are simultaneously introduced to the vinyl group of the styrene. The nitration of the reaction product yields compounds characterized by the following general formula:

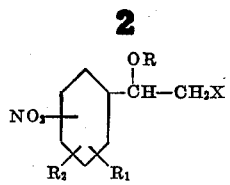

wherein R represents a lower alkyl group, e. g., methyl, ethyl, n-propyl, isopropyl, n-butyl, s.-butyl, tert.-butyl, and the like, $R_1$ represents hydrogen, a lower alkyl group, e. g., methyl, ethyl, propyl, isopropyl, butyl, etc. lower dialkylamino, e. g., dimethylamino, diethylamino, etc., cyano, trifluoromethyl, lower alkoxy, e. g., methoxy, ethoxy, propoxy, butoxy, etc., halogen, e. g., chlorine, bromine, and fluorine, and $R_2$ represents hydrogen, a lower alkyl or a halogen of the same value as $R_1$, and X is a halogen, such as chlorine or bromine.

From the foregoing compounds, p-nitroacetophenones are obtained in good yields and high purity by a process, which involves dehydrohalogenation with alcoholic sodium or potassium hydroxide to the nitrated vinyl ether and hydrolysis of this to the nitroacetophenone. It is based on cheap and readily available raw materials, i. e., a styrene, a lower alcohol, a halogen, and nitric acid.

In practicing the present invention an equimolecular amount of a styrene, having a nuclear position susceptible to nitration, is halogenated in a lower alkyl alcohol, such as methyl, ethyl, propyl, or butyl alcohol. The reaction may be carried out over a wide temperature range, varying from below room temperature to above room temperature, but it is preferably conducted within the temperature range of —5° C. to 30° C. for a time sufficient to permit the equivalent of halogen to be absorbed.

As examples of suitable styrenes which may be reacted with a lower alcohol and either chlorine or bromine according to the foregoing procedure, the following may be mentioned:

| | |
|---|---|
| o-chlorostyrene | 2,3-dichlorostyrene |
| m-chlorostyrene | 2,4-dichlorostyrene |
| p-chlorostyrene | 2,5-dichlorostyrene |
| m-bromostyrene | 2,6-dichlorostyrene |
| p-bromostyrene | 3,4-dichlorostyrene |
| o-fluorostyrene | 3,5-dichlorostyrene |
| p-fluorostyrene | o-cyanostyrene |
| o-methoxystyrene | m-cyanostyrene |
| m-methoxystyrene | p-cyanostyrene |
| p-methoxystyrene | 3.5-dimethylstyrene |
| p-ethoxystyrene | 2,4-dimethylstyrene |
| m-trifluoromethylstyrene | 2,5-dimethylstyrene |
| m-methylstyrene | 3,4-dimethylstyrene |
| p-N,N-dimethylamino- | m-t-butylstyrene |
| styrene | m-s-butylstyrene |

When utilizing gaseous chlorine, the chlorination of a styrene may be effected in the presence or absence of an alkaline medium, such as an acid binding agent. In an alkaline medium, using such alkaline reagents as hydroxides or carbonates of alkali metals or alkaline earth metals, heterocyclic nitrogenous bases, such as pyridine, dimethylpyridine, ethylpyridine, ethylmethylpyridine, trimethylpyridine, quinoline and the like, trialkylamine, such as trimethylamine, triethylamine, tributylamine, etc., alkoxides of alkali metals, such as sodium alkoxides, and alkali metal salts of lower aliphatic acids, such as sodium acetate, it is preferable to carry out the addition of halogen at a lower temperature, i. e., −5° to 5° C. The alkaline reagent is preferably used in an amount in excess to the equimolecular amount of a styrene and may be added all at once, portionwise, or by gradual addition. Throughout the main part of the chlorination reaction the pH remains above 10, and a weak hypochlorite test is obtained as indicated by acidified potassium iodide solution. The addition of chlorine is discontinued when the pH reaches 6 to 7. At this point, continued chlorination does not increase the yield of the desired product and stronger hypochlorite tests are obtained.

After chlorination is complete, the copious white precipitate is filtered off and washed with methanol. If the filtrate at this point is slightly alkaline (pH=7–8), it should be brought back to pH=5–6 with a small amount of concentrated mineral acid.

The methanol or lower alkyl alcohol is stripped off through a column at atmospheric or reduced pressure until two layers are formed in the still pot (about 90–95% alcohol is removed). Alternatively, the alcholic solution may be added to several volumes of water and the heavy organic layer separated. The organic layer is washed with water to remove dissolved alcohol and salts.

The yield of the crude product averages 92–93% of theory.

This crude product is in a form ready for the nitration procedure.

The reaction may also be carried out expeditiously in the absence of alkali over a wide temperature range, varying from below room temperature to above room temperature, but it is preferably carried out within the temperature range of 5° to 30° C. In such case the chlorination is carried out in the lower alcohol until the equivalent weight of chlorine has been absorbed. A negative hypochlorite test is observed throughout the reaction. However, if the chlorination is continued, a positive hypochlorite test is obtained. The entire reaction mixture is then drowned in a sufficient volume of water, and the heavy product layer separated and washed with water to remove the lower alcohol. The yield of the crude product ranges from 95 to 97% of theory, and is somewhat higher than that obtained by the chlorination in the presence of alkali.

Bromination may be carried out in a manner similar to that employed for the preparation of the chlorine derivatives. Bromine may be added dropwise to the styrene-alcohol mixture, in the presence or absence of an alkali, until the required weight has been absorbed corresponding to the formation of the bromo alkoxy derivative. At this point, the reaction usually is acidic in character. A positive test for hypobromite is obtained under conditions similar to those previously indicated for a positive hypochlorite test.

At the end of the addition of bromine, the product is isolated in a manner analogous to that previously indicated for the corresponding chloro-derivative. The precipitated inorganic salts may be filtered and the alcohol removed by distillation, or the reaction mixture may be added to several volumes of water and the organic layer separated.

Nitration of the ethers prepared in the foregoing manner yields predominantly o-, and p-nitro-isomers and to a lesser extent the m-isomer. The process is also applicable to styrenes having one or two nuclear positions available for nitration.

The nitration is effected by adding 1 part of the ether with stirring during a period of 15 minutes to 1 hour, to 5–6 parts of fuming nitric acid, which had been cooled, and is maintained at a temperature ranging from −50° to −55° C. A red color is formed as the ether is added. The color discharges rapidly at first and more slowly toward the end of the addition so that the mixture must be agitated until the addition is complete. The end point of the reaction is indicated by the disappearance of all red color leaving a clear yellow solution. The solution is run into ice causing the separation of a yellow oil which upon stirring for 15 to 45 minutes partially solidifies to a mushy mass. The aqueous layer is decanted and the organic layer treated with a lower alcohol. The alcohol mixture is agitated for several miutes and cooled to 0° C. It is then filtered and washed with alcohol at 0° C. When using the α-(chloromethyl)-benzyl methyl ether derived from styrene, the α-(chloromethyl)-4-nitrobenzyl methyl ether is isolated directly by this method. When the analogous chloro-ethers derived from nuclear-substituted styrenes are employed, the desired nitro-isomer of the halo ether is obtained by fractional crystallization or fractional distillation of the nitrated mixture.

The following examples will serve to illustrate the method of preparing the ethers and the nitro-derivatives thereof.

EXAMPLE I

*α(Chloromethyl)-benzylmethyl ether*

To a solution of 130 parts of sodium methylate in 1000 parts of methanol were added 208 parts of redistilled styrene and the resultant solution was chilled to 0° C. Chlorine gas was passed into this mixture with stirring at +5° to −5° C. until 153 parts of chlorine had been absorbed. The precipitated inorganic salts were filtered off and the filtrate was concentrated by the removal of 800–900 parts of methanol by distillation.

The precipitated salts in the stillpot were dissolved by the addition of excess water and the oily organic layer was separated. The aqueous layer was extracted with chloroform and the chloroform layer was added to the organic layer. The solvent with traces of water was distilled off and the product was fractionated through a packed column.

There were obtained 228 parts of a colorless α-(chloromethyl)-benzylmethyl ether which represents a 72% yield.

EXAMPLE II

*α-(Chloromethyl)-benzylisopropyl ether*

To a mixture of 48 parts of sodium hydroxide in 500 parts of isopropanol were added 104 parts of redistilled styrene and the resultant mixture chilled to 0° C. Chlorine gas was passed into this mixture with stirring at +5° to −5° C. until 79 parts of chlorine had been absorbed.

The material was worked up as in Example I obtaining 115 parts of distilled product which represents a 58% yield.

EXAMPLE III

α-(Chloromethyl)-benzylethyl ether

To a solution of 208 grams of styrene in 1000 mls. of ethanol, gaseous chlorine was passed at 25° to 30° C. until 144 grams (2 mols) of chlorine had been absorbed. The reaction mixture, which was strongly acidic and colored yellow, was drowned in 4 liters of water, the heavy-product-layer separated and washed with water to remove the ethanol. The yield of the crude product was 339 grams or 92% of theory.

EXAMPLE IV

α-(Bromomethyl) benzylmethyl ether

To a solution of 96 parts of sodium hydroxide in 1000 parts of methanol were added 208 parts of redistilled styrene and the resultant solution was chilled to 0° C. To this mixture were added dropwise 350–360 parts of bromine over a period of 4–5 hours at —5° to +5° C. until the pH of the reaction had reached 6–7. The precipitated salts were filtered off and, if necessary, the pH of the filtrate was adjusted to 5–6 with mineral acid. The methanol was distilled off until a two-phase solution was obtained in the stillpot. The crude product, after washing with water, weighed 361 grams which represents an 89% yield.

EXAMPLE V

α-(Chloromethyl)-3-methylbenzylethyl ether

Example III was repeated with the exception that an equivalent amount of styrene was replaced by an equivalent amount of m-methylstyrene.

EXAMPLE VI

α-(Chloromethyl)-3,5-dichlorobenzylethyl ether

Example III was repeated with the exception that the styrene was replaced by an equivalent amount of 3,5-dichlorostyrene.

EXAMPLE VII

α-(Chloromethyl)-3,5-Dimethylbenzylethyl ether

Example III was repeated with the exception that the styrene was replaced by an equivalent amount of 3,5-dimethylstyrene.

EXAMPLE VIII

α-(Chloromethyl)-4-nitrobenzylmethyl ether

In a glass-lined kettle equipped with an agitator, 450 parts by weight of fuming nitric acid were placed and the acid cooled to —50° C. During a period of 1 hour, 85 parts by weight of α-(chloromethyl)-benzylmethyl ether of Example I were added to the nitric acid at —50° to —55° C. A red color was formed as the material was added. The color discharged rapidly at first and more slowly toward the end of the addition so that the mixture was agitated for approximately 1 hour at —50° to —55° C. after all was added. The end point of the reaction was indicated by the disappearance of all red color leaving a clear yellow solution. The solution was run into 700 parts by weight of ice causing a separation of a yellow oil which upon stirring for 30 minutes partially solidified to a mushy mass. The aqueous liquor layer was decanted and to the residue 200 parts of methanol were added and the mixture agitated and cooled to 0° C. The mixture was filtered, washed with 50 parts of methanol at 0° C. and dried. Upon drying, 35 parts by weight of α-(chloromethyl)-4-nitrophenol methyl ether melting at 55° to 56.5° C. were obtained.

EXAMPLE IX

α-(Chloromethyl)-4-nitrobenzylisopropyl ether

Example VIII was repeated with the exception that an equivalent amount of α-(chloromethyl)-benzylmethyl ether of Example I was replaced by an equivalent amount of α-(chloromethyl)-benzylisopropyl ether of Example II.

EXAMPLE X

α-(Chloromethyl)-4-nitro-3-methylbenzyl ethyl ether

Example VIII was again repeated with the exception that an equivalent amount of α-(chloromethyl)-benzylmethyl ether was replaced by an equivalent amount of α-chloromethyl)-3-methyl benzylethyl ether of Example V.

EXAMPLE XI

The product of Example VI was nitrated according to the procedure of Example VIII to yield a product characterized by the following formula:

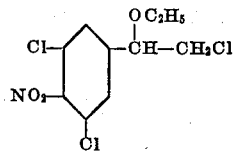

EXAMPLE XII

Example VIII was repeated with the exception that an equivalent amount of α-(chloromethyl)-benzylmethyl ether was replaced by an equivalent amount of α-(chloromethyl)-3,5-dimethylbenzylethyl ether of Example VII.

The mononitro derivatives of the ethers may be readily converted to nitroacetophenone by heating with alcoholic caustic followed by hydrolysis with aqueous acid.

We claim:

1. α-(Mononitro - monocyclic aryl) - α - haloethyl lower alkyl ethers characterized by the following general formula:

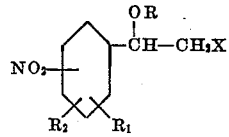

wherein R represents a lower alkyl group, R₁ represents a member selected from the class consisting of hydrogen, lower alkyl, lower dialkylamino, lower alkoxy, halogen, cyano, and trifluoromethyl, R₂ represents a member selected from the class consisting of hydrogen, lower alkyl, and halogen, and X represents a halogen selected from the class consisting of chlorine and bromine.

2. α - (Chloromethyl) - 4 - nitrobenzylmethyl ether having the following formula:

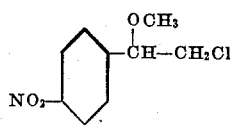

3. α-(Chloromethyl) - 4 - nitrobenzylisopropyl ether having the following formula:

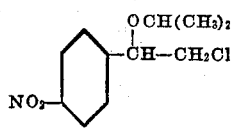

4. α-(Chloromethyl)-4-nitro-3-methylbenzylethyl ether having the following formula:
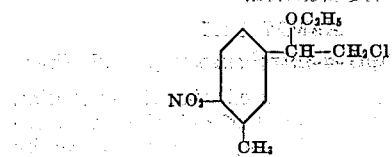
5. α-(Chloromethyl)-4-nitro-3,5-dichlorobenzylethyl ether having the following formula:
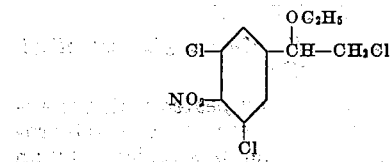
6. α-(Chloromethyl)-4-nitro-3,5-dimethylbenzylethyl ether having the following formula:
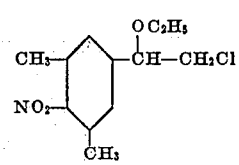
JOSEPH M. WILKINSON.
GEORGE W. PEDLOW.
ROGER F. KLEINSCHMIDT.
No references cited.